United States Patent
Nishio

(10) Patent No.: US 9,491,332 B2
(45) Date of Patent: Nov. 8, 2016

(54) CLOCK TRANSFER CIRCUIT, VIDEO PROCESSING SYSTEM, AND SEMICONDUCTOR INTEGRATED CIRCUIT

(71) Applicant: Panasonic Intellectual Property Management Co., Ltd., Osaka (JP)

(72) Inventor: Yuuki Nishio, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/553,541

(22) Filed: Nov. 25, 2014

(65) Prior Publication Data

US 2015/0109531 A1    Apr. 23, 2015

Related U.S. Application Data

(63) Continuation of application No. PCT/JP2012/003596, filed on May 31, 2012.

(51) Int. Cl.
| | |
|---|---|
| H04N 5/08 | (2006.01) |
| H04N 7/01 | (2006.01) |
| G06F 5/06 | (2006.01) |
| G09G 5/00 | (2006.01) |
| H04N 21/43 | (2011.01) |
| H04N 21/436 | (2011.01) |
| H04N 21/4363 | (2011.01) |

(52) U.S. Cl.
CPC ........... *H04N 5/08* (2013.01); *G06F 5/06* (2013.01); *G09G 5/005* (2013.01); *H04N 7/0105* (2013.01); *H04N 21/4305* (2013.01); *H04N 21/43632* (2013.01); *G06F 2205/061* (2013.01); *G09G 5/006* (2013.01); *G09G 2340/0435* (2013.01); *G09G 2370/10* (2013.01)

(58) Field of Classification Search
None
See application file for complete search history.

(56) References Cited

U.S. PATENT DOCUMENTS

| | | | | |
|---|---|---|---|---|
| 7,936,789 B2* | 5/2011 | To | ................. | H04L 7/10 327/146 |
| 2001/0021201 A1* | 9/2001 | Tanaka | .............. | H04J 3/076 370/526 |
| 2003/0076911 A1* | 4/2003 | Kobayashi | ......... | H04J 3/07 375/372 |

FOREIGN PATENT DOCUMENTS

| | | |
|---|---|---|
| JP | 02-239736 A | 9/1990 |
| JP | 2001-308839 A | 11/2001 |
| JP | 2002-026882 A | 1/2002 |
| JP | 2003-087599 A | 3/2003 |
| JP | 2009-218885 A | 9/2009 |

OTHER PUBLICATIONS

International Search Report issued in PCT/JP2012/003596, dated Sep. 4, 2012, with English translation.

* cited by examiner

*Primary Examiner* — Michael Teitelbaum
(74) *Attorney, Agent, or Firm* — McDermott Will & Emery LLP

(57) ABSTRACT

A clock transfer circuit receives input data synchronized with a first clock, and outputs, as output data, data synchronized with a second clock having a frequency different from that of the first clock. A write address controller is operating according to the first clock, and provides a write address to a memory. A read address controller is operating according to the second clock, and provides a read address to the memory. A cycle comparator compares the cycle of a predetermined event between the input data and the output data. Based on such a comparison result, the clock adjuster adjusts the frequency of the second clock.

16 Claims, 14 Drawing Sheets

FIG.6(A)  COMPARISON PER LINE
EDGES OF INPUT
HORIZONTAL
SYNCHRONIZATION
SIGNAL
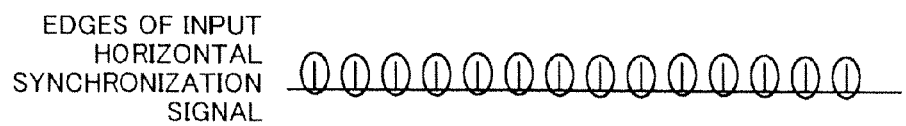
FIG.6(B)  COMPARISON EVERY TWO LINES
EDGES OF INPUT
HORIZONTAL
SYNCHRONIZATION
SIGNAL
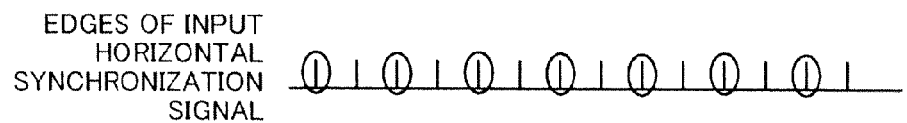
FIG.6(C)  COMPARISON EVERY n LINES
EDGES OF INPUT
HORIZONTAL
SYNCHRONIZATION
SIGNAL
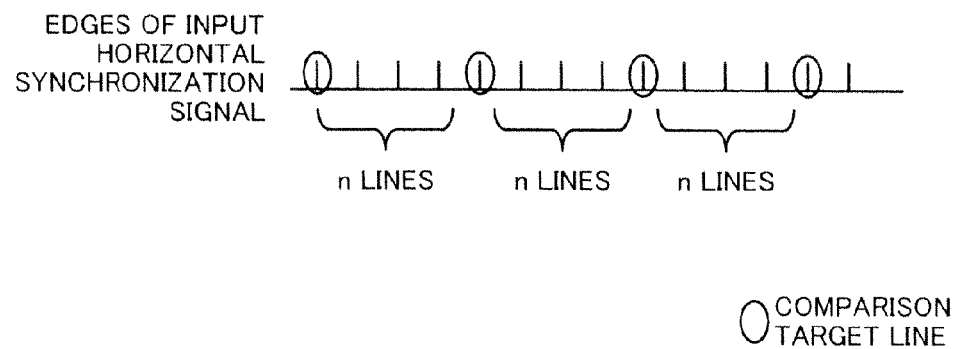
○ COMPARISON TARGET LINE FIG.7(A)  COMPARISON PER FIELD
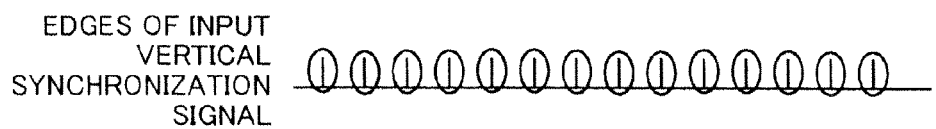
FIG.7(B)  COMPARISON EVERY TWO FIELDS
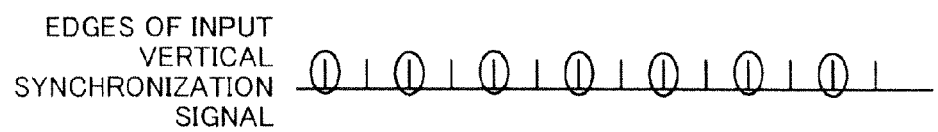
FIG.7(C)  COMPARISON EVERY n FIELDS
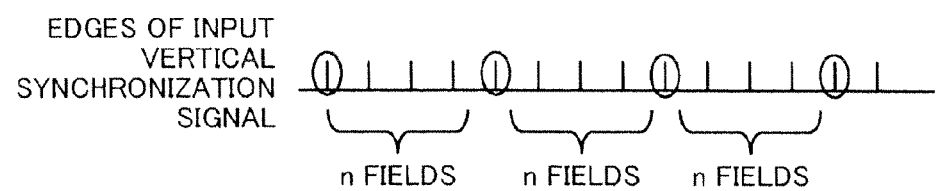
○ COMPARISON TARGET FIELD

CLOCK TRANSFER CIRCUIT, VIDEO PROCESSING SYSTEM, AND SEMICONDUCTOR INTEGRATED CIRCUIT

CROSS-REFERENCE TO RELATED APPLICATIONS

This is a continuation of International Application No. PCT/JP2012/003596 filed on May 31, 2012. The entire disclosures of these applications are incorporated by reference herein.

BACKGROUND

The present disclosure relates to a clock transfer circuit configured to perform transfer from a clock with which input data is synchronized to another clock having a different frequency and to output such data.

A clock transfer circuit is configured to perform transfer from a clock with which input data is synchronized to another clock having a different frequency and to output such data. In the clock transfer circuit, e.g., a 2-port RAM is used to control a write address and a read address with a moderate distance therebetween, thereby performing transfer from a clock with which write data is synchronized to another clock having a different frequency and reading and transmitting such data.

If address conflict occurs due to gradual narrowing of the distance between the write address and the read address, so-called "failure in memory address control" occurs. Conventionally, in order to reduce or prevent such address conflict, the write address and the read address are compared with each other, and the addresses are reset when the distance between the addresses is gradually narrowed to cause the address conflict.

According to Japanese Unexamined Patent Publication No. 2009-218885, a write address is converted into a Gray-code format, and retiming is performed using a read clock. In this manner, transfer between clocks is performed.

SUMMARY

Although failure in memory address control can be reduced or prevented to a certain extent by the foregoing method, accumulated data is discarded or double-read due to resetting of the addresses. Thus, omission of part of output data or duplication of part of the output data occurs, resulting in quality degradation.

If there are many variations in write and read clocks, it is difficult to take a clock transfer delay time into consideration. For example, in the case of Japanese Unexamined Patent Publication No. 2009-218885, retiming is performed using the read clock after the write address is converted into the Gray-code format. Thus, it is complicated to take, e.g., the delay time in clock transfer according to a clock cycle into consideration, and therefore address control becomes difficult.

In a data transmission method, such as DisplayPort, in which a read clock is generated from a write clock by a clock generation parameter transmitted from a transmission side, it is often the case that the read clock cannot successfully follow the data transmission. In this case, if the above-described method for avoiding failure in memory address control by address comparison is used, addresses are often reset. Thus, omission of part of output data or duplication of part of the output data occurs, resulting in quality degradation. Note that frequent address resetting can be avoided in such a manner that a memory size is increased. However, such a method is not preferable because an increase in memory size results in an increase in circuit size and cost.

The present disclosure is directed to provide a clock transfer circuit capable of reducing, without increasing a circuit size and cost, quality degradation due to data omission or data duplication.

In one aspect of the present disclosure, a clock transfer circuit which receives input data synchronized with a first clock and outputs, as output data, data synchronized with a second clock having a frequency different from that of the first clock includes a memory; a write address controller operating according to the first clock and configured to generate a write address of the memory in which the input data is written; a read address controller operating according to the second clock and configured to generate, in order of writing the input data, a read address of the memory from which the output data is read; a cycle comparator configured to compare a cycle of a predetermined event between the input data and the output data; and a clock adjuster configured to adjust, based on a comparison result obtained by the cycle comparator, the frequency of the second clock such that the cycle of the predetermined event becomes coincident between the input data and the output data.

According to such an aspect, the cycle comparator compares the cycle of the predetermined event between the input data and the output data. Moreover, the clock adjuster adjusts, based on the comparison result obtained by the cycle comparator, the frequency of the second clock such that the cycle of the predetermined event becomes coincident between the input data and the output data. This reduces or prevents failure in memory address control in advance, and therefore quality degradation due to data omission or data duplication can be reduced or prevented.

In another aspect of the present disclosure, a clock transfer circuit which receives input data synchronized with a first clock and outputs, as output data, data synchronized with a second clock having a frequency different from that of the first clock includes a memory; a write address controller operating according to the first clock and configured to generate a write address of the memory in which the input data is written; a read address controller operating according to the second clock and configured to generate, in order of writing the input data, a read address of the memory from which the output data is read; a cycle comparator configured to compare a held first value and a second value obtained after the first value is held, the first and second values being a time difference in a predetermined event between the input data and the output data; and a clock adjuster configured to adjust, based on a comparison result obtained by the cycle comparator, the frequency of the second clock such that the time difference is maintained constant.

According to such an aspect, the cycle comparator compares, between the held first value and the value obtained after the first value is held, the time difference in predetermined event between the input data and the output data. Moreover, the clock adjuster adjusts, based on the comparison result obtained by the cycle comparator, the frequency of the second clock such that the time difference in predetermined event between the input data and the output data is maintained constant. This reduces or prevents failure in memory address control in advance, and therefore quality degradation due to data omission or data duplication can be reduced or prevented.

According to the present disclosure, failure in memory address control can be reduced or prevented in advance, and therefore quality degradation due to data omission or data duplication can be reduced or prevented. Moreover, even if errors in a clock generation parameter transmitted from a transmission side or delay in reception of the transmitted clock generation parameter occur in a data transmission method such as DisplayPort, failure in memory address control can be reduced or prevented in advance. As a result, a memory size can be reduced.

BRIEF DESCRIPTION OF THE DRAWINGS

FIGS. 6(A), 6(B) and 6(C) are diagrams illustrating operation timing of the cycle comparator of FIG. 5.

FIGS. 7(A), 7(B) and 7(C) are diagrams illustrating operation timing of a variation of the cycle comparator of FIG. 5.

DETAILED DESCRIPTION

Embodiments will be described below with reference to drawings. In the present disclosure, a video processing system will be described as an example, and DisplayPort will be described as an example of a data transmission method. However, the present disclosure is not limited to the foregoing, and may be implemented using other systems including clock transfer circuits.

First Embodiment

Figure 1:
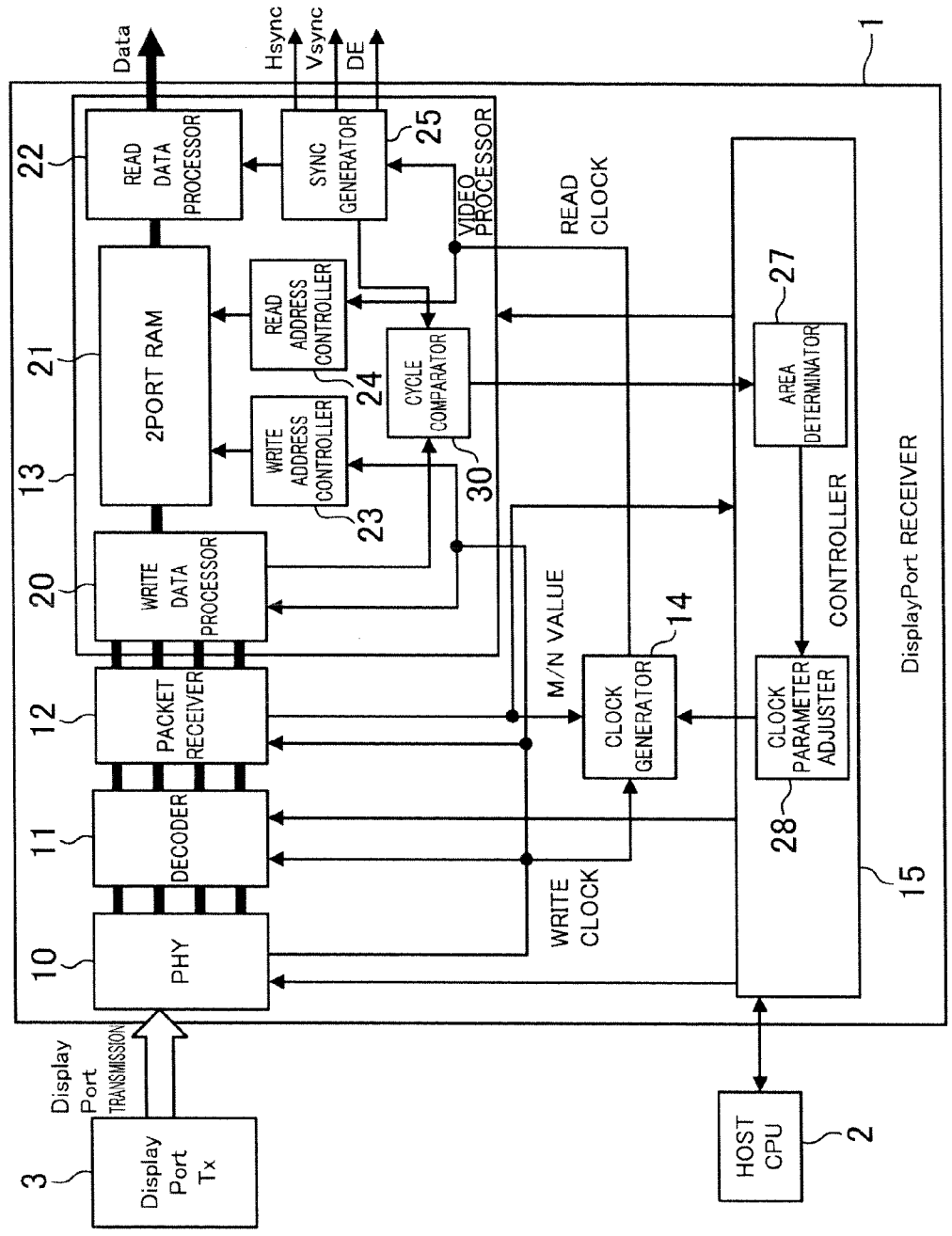
FIG. 1 is a diagram illustrating the configuration of a video processing system of an embodiment.

FIG. 1 is a diagram illustrating the configuration of a video processing system of a first embodiment. Referring to FIG. 1, a DisplayPort receiver 1 is controlled by a host CPU 2, and data is transmitted from a transmission-side unit 3 via DisplayPort. In the DisplayPort receiver 1, a PHY 10 receives transmitted data, and a decoder 11 decodes the data. Then, a packet receiver 12 receives various types of packets. A video processor 13 is configured to receive the video data to perform video data sorting and clock transfer, and then output video data Data, a horizontal synchronization signal Hsync, a vertical synchronization signal Vsync, and a data valid enable signal DE.

The DisplayPort generates, on a reception side thereof, a read clock from a write clock by a clock generation parameter transmitted from a transmission side. A clock generator 14 is configured to receive a clock generation parameter M/N from the packet receiver 12 to generate, using the clock generation parameter M/N, the read clock from the write clock. A calculation formula is as follows:

$$\text{Read Clock} = \text{Write Clock} \times (M/N)$$

Moreover, a synchronization signal (Sync) generation parameter etc. are also transmitted from the transmission side of the DisplayPort. The transmitted Sync generation parameter is output from the packet receiver 12 to the video processor 13 via a controller 15, and is used for Sync generation.

The video processor 13, the clock generator 14, and the controller 15 form a clock transfer circuit. Moreover, the DisplayPort receiver 1 including the clock transfer circuit and other processors together form a semiconductor integrated circuit.

The configuration of the video processor 13 is as follows.

A write data processor 20 is configured to prepare data to be written in a 2-port RAM 21 provided as an example of a memory and to write the data in a write address of the 2-port RAM 21 generated by a write address controller 23. A read data processor 22 is configured to read data from a read address of the 2-port RAM 21 generated by a read address controller 24 and to format the data into, e.g., data of "Red/Green/Blue" to output the formatted data as the video data Data. In order to reduce or prevent failure in RAM address control, the write address controller 23 and the read address controller 24 generates the addresses such that the difference between the write address and the read address corresponds to, e.g., about the half of the depth of the 2-port RAM 21. A Sync generator 25 is configured to generate the horizontal synchronization signal Hsync, the vertical synchronization signal Vsync, and the data valid enable signal DE based on the Sync generation parameter transmitted from the packet receiver 12 via the controller 15 and to output these signals. The write data processor 20 and the write address controller 23 operate according to the write clock, and the read data processor 22, the read address controller 24, and the Sync generator 25 operate according to the read clock.

A cycle comparator 30 is configured to receive, from the write data processor 20, a signal indicating horizontal synchronization timing of write data and to receive the horizontal synchronization signal Hsync from the Sync generator 25. Based on the received signals, the cycle comparator 30 compares the cycle of the horizontal synchronization timing between the write data and read data. Ideally, there is coincidence between the cycle of the horizontal synchronization timing of the write data and the cycle of the horizontal synchronization timing of the read data. A comparison result of the cycle comparator 30 is transmitted to the controller 15.

In the controller 15, an area determinator 27 determines, based on the comparison result, the area indicating the degree of cycle deviation, and a clock parameter adjuster 28 adjusts the clock generation parameter depending on the determined area. The clock generator 14 generates the read clock by the adjusted clock generation parameter. Thus, the frequency of the read clock is adjusted such that the cycle of the horizontal synchronization timing of the write data and the cycle of the horizontal synchronization timing of the read data are coincident with each other. The area determinator 27, the clock parameter adjuster 28, and the clock generator 14 form a clock adjuster.

Figure 2:
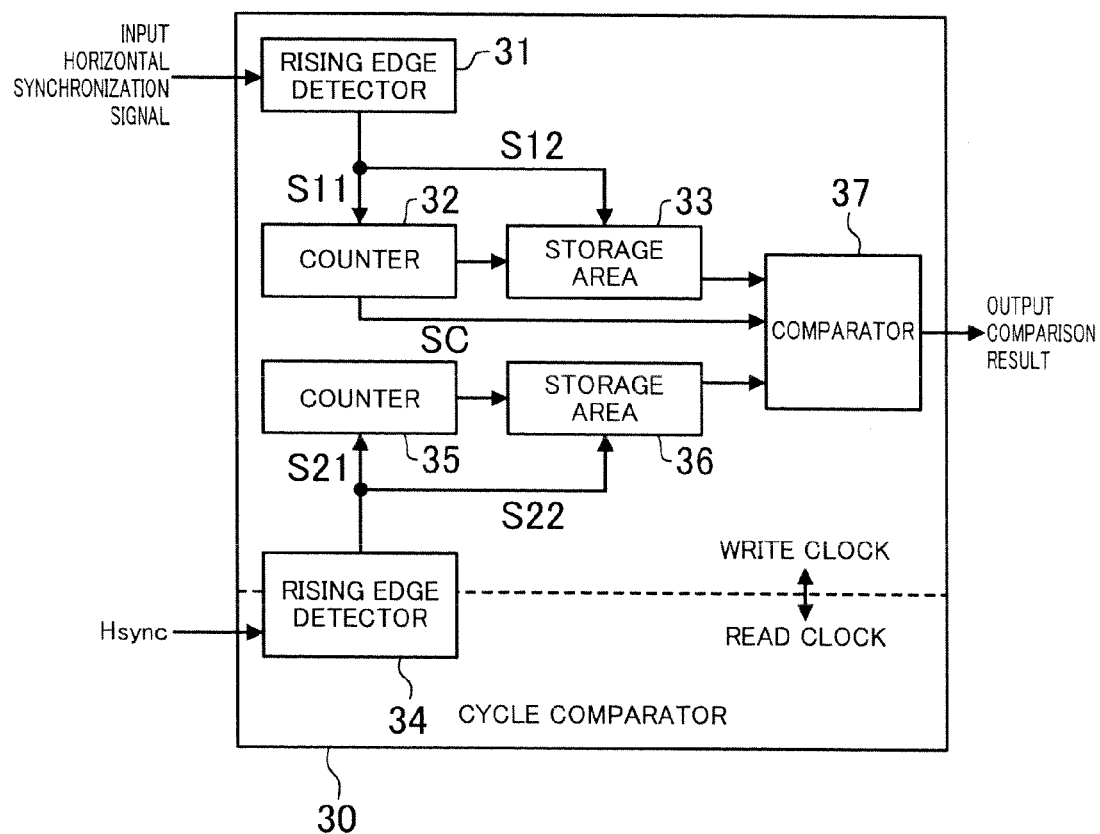
FIG. 2 is a diagram illustrating an example of the configuration of a cycle comparator of a first embodiment.

FIG. 2 illustrates an example of the configuration of the cycle comparator of the present embodiment. The cycle comparator 30 illustrated in FIG. 2 receives an input horizontal synchronization signal from the write data processor 20 and to receive an output horizontal synchronization signal Hsync from the Sync generator 25. Note that the write data processor 20 is capable of decoding horizontal synchronization information from a flag of input data, and therefore the input horizontal synchronization signal can be generated based on a decoding result.

A rising edge detector 31 is configured to detect a rising edge of the input horizontal synchronization signal and to transmit the detected edge signal to a counter 32 as a counter start signal S11. The counter 32 counts up in synchronization with the write clock, and is cleared by the counter start signal S11. The edge signal is also transmitted to a storage area 33 as a counter storage signal S12. Upon reception of the counter storage signal S12, the storage area 33 holds the count value obtained by the counter 32. Thus, the storage area 33 holds the value right before the counter 32 is cleared. That is, the count value of the input horizontal cycles obtained using the write clock is held by the storage area 33 every rising edge of the input horizontal synchronization signal. The rising edge detector 31, the counter 32, and the storage area 33 form a first counter configured to count the input horizontal cycles.

On the other hand, a rising edge detector 34 is configured to detect a rising edge of the horizontal synchronization signal Hsync which is an output horizontal synchronization signal synchronized with the read clock. Then, the rising edge detector 34 shifts the rising edges so that sampling can be performed using the write clock, and causes the horizontal synchronization signal Hsync to be synchronized with the write clock. Subsequently, the rising edge detector 34 outputs a counter start signal S21 and a counter storage signal S22. Note that the signal transferring between two different clocks is only the horizontal synchronization signal Hsync, and therefore this saves time and manpower in, e.g., clock transfer using Gray code.

A counter 35 counts up in synchronization with the write clock, and is cleared by the counter start signal S21. Upon reception of the counter storage signal S22, a storage area 36 holds the count value obtained by the counter 35. Thus, the storage area 36 holds the value right before the counter 35 is cleared. That is, the count value of the output horizontal cycles obtained using the write clock is held by the storage area 36 every rising edge of the horizontal synchronization signal Hsync. The rising edge detector 34, the counter 35, and the storage area 36 form a second counter configured to count the output horizontal cycles. Note that counting by the first and second counters may be performed using a predetermined clock other than the write clock.

A comparator 37 is configured to compare, according to a comparison timing signal SC, between the count value stored in the storage area 33 and the count value stored in the storage area 36 and to output a comparison result. For example, the difference between two count values is output as the comparison result. In this case, the comparison timing signal SC is output from the counter 32. The counter 32 outputs the comparison timing signal SC, e.g., when the value reaches the half of the count value stored in the storage area 33 during counting. Alternatively, the counter 32 may output the comparison timing signal SC, e.g., when the value reaches a certain value such as "100" during counting. Note that the unit and method for generating the comparison timing signal SC is not limited to the foregoing as long as comparison is performed off the timing at which the counter values are written in the storage areas 33, 36.

Figure 3:
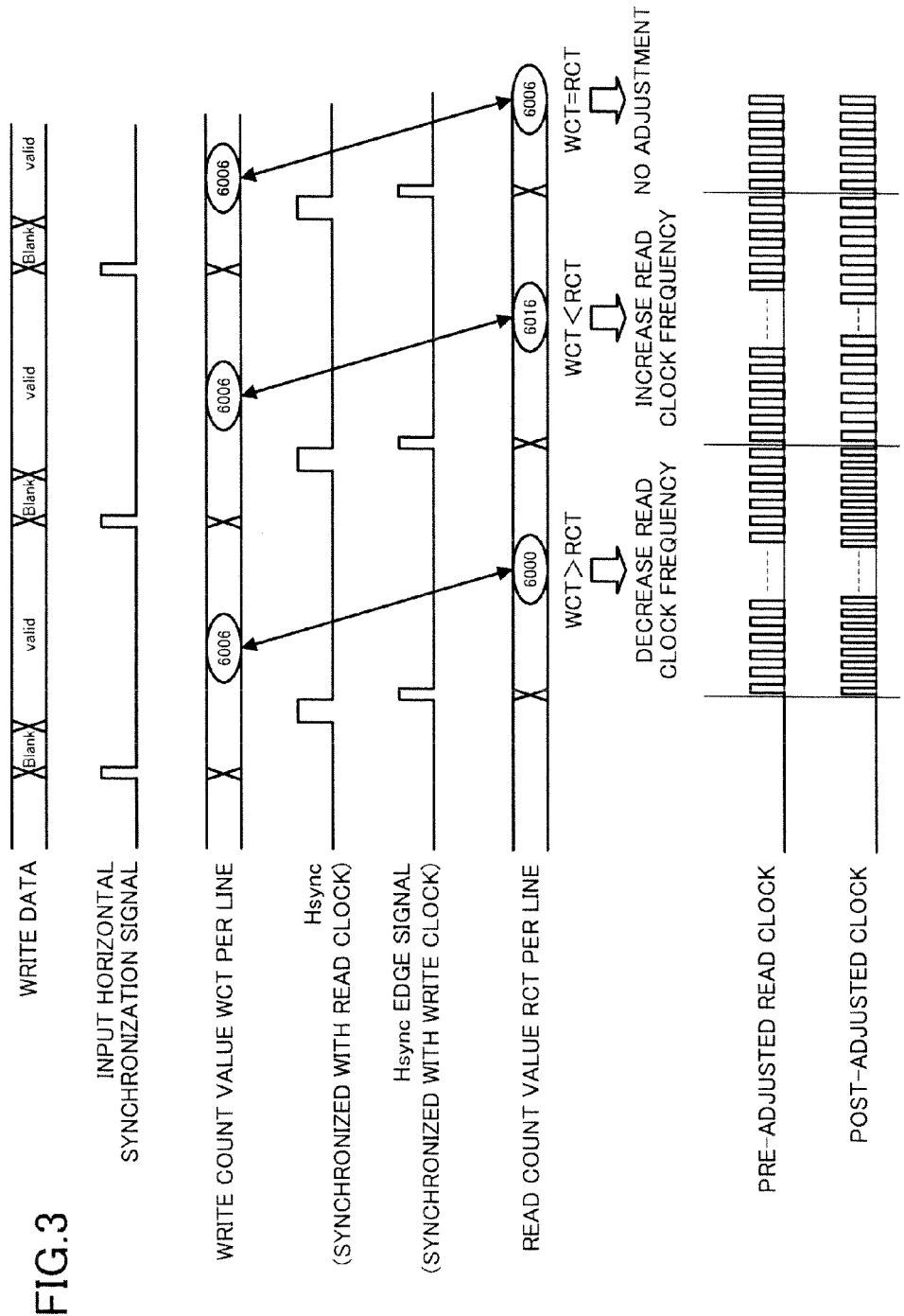
FIG. 3 is a diagram illustrating adjustment performed in the first embodiment.

FIG. 3 illustrates an example of adjustment performed in the present embodiment. As described above, the write data processor 20 generates the input horizontal synchronization signal from the write data. The cycle comparator 30 obtains, upon reception of the input horizontal synchronization signal, the count value between the edges, i.e., a write count value WCT per line. Moreover, the cycle comparator 30 generates the horizontal synchronization signal Hsync synchronized with the write clock from the horizontal synchronization signal Hsync synchronized with the read clock. Then, the cycle comparator 30 obtains the count value between the edges, i.e., a read count value RCT per line.

When the write count value WCT is "6006," and the read count value RCT is "6000," WCT>RCT. Thus, the horizontal cycle of the read data is shorter than that of the write data. This means that the read clock is faster (has a higher frequency), and therefore the controller 15 adjusts the clock generator 14 such that the frequency of the read clock is decreased. Accordingly, transition of the read address slows down.

On the other hand, when the write count value WCT is "6006," and the read count value RCT is "6016," WCT<RCT. Thus, the horizontal cycle of the read data is longer than that of the write data. This means that the read clock is slower (has a lower frequency), and therefore the controller 15 adjusts the clock generator 14 such that the frequency of the read clock is increased. Accordingly, transition of the read address speeds up.

When the write count value WCT is "6006," and the read count value RCT is also "6006," WCT=RCT. That is, the horizontal cycle of the read data is coincident with that of the write data. In this case, no adjustment is performed.

As just described, comparison of the horizontal cycle is performed every line, and the frequency of the read clock is adjusted. That is, referring to FIG. 3, the frequency of the read clock is adjusted so as to increase, decrease, or be unchanged with the period corresponding to the horizontal cycle of output data as a unit. Thus, failure in RAM address control can be reduced or prevented in advance.

Figure 4:
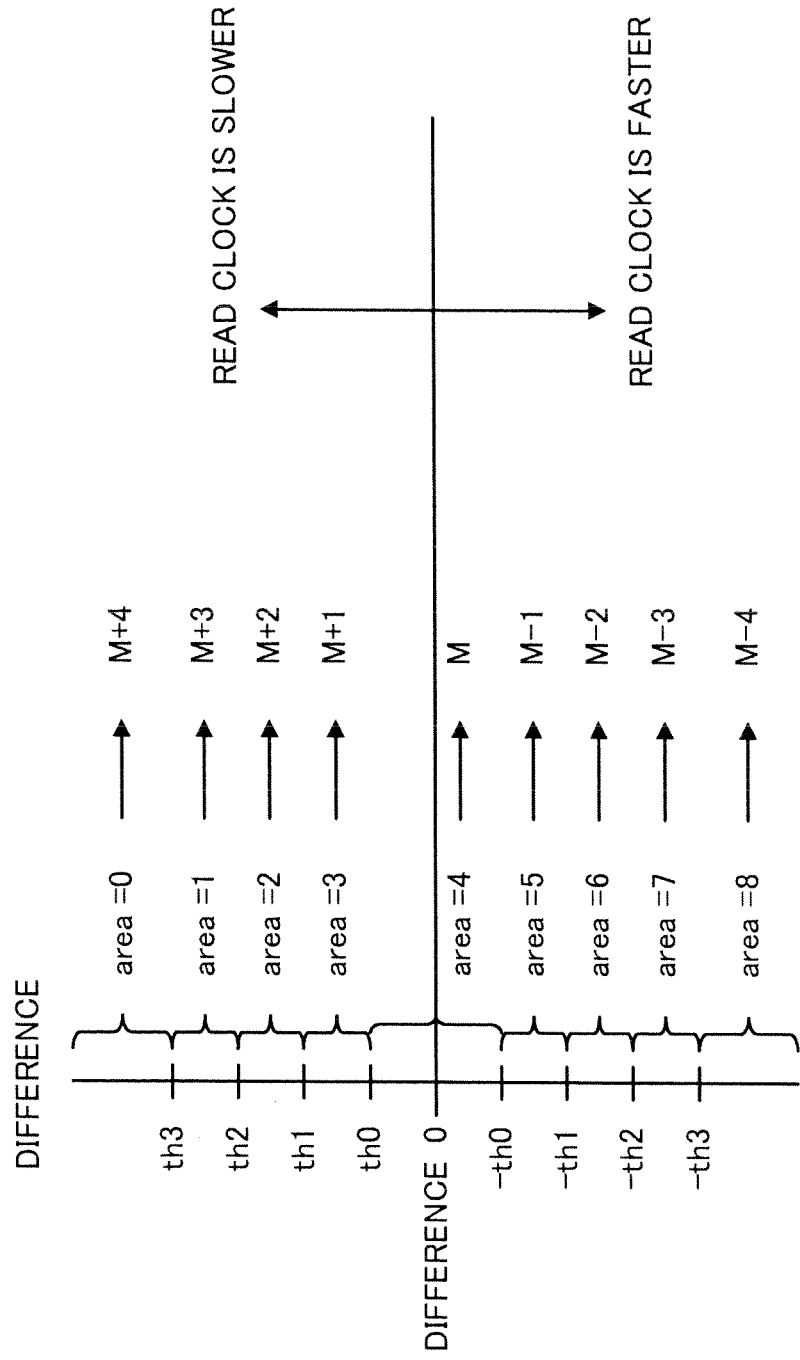
FIG. 4 is a diagram illustrating an example of the method for adjusting a clock parameter.

FIG. 4 illustrates an example of clock parameter adjustment in the present embodiment. The area determinator 27 is configured to determine within which area, which is separated according to thresholds, the difference output from the cycle comparator 30 falls. In the example of FIG. 4, areas 0 to 8 are set according to thresholds −th3 to th3. For example, when the difference is equal to or greater than th3, it is determined that area is "0." When the difference is equal to or greater than th2 and less than th3, it is determined that area is "1." Note that the way to separate the areas from each other is not limited to the foregoing, and the number of areas, the range of areas, etc. may be optionally set. Moreover, the area determinator 27 may be configured as follows: the thresholds are pre-set fixed values; or, e.g., a register is used so that the thresholds can be adjusted by an external unit such as the host CPU 2. Since the thresholds can be adjusted by the external unit, optimal area determination can be freely set according to characteristics on the transmission side. Moreover, although FIG. 4 illustrates that the same thresholds th0 to th3 are set between a positive side and a negative side, but different thresholds may be, needless to say, set between the positive side and the negative side.

The clock parameter adjuster 28 is configured to increase/decrease, based on area information determined by the area determinator 27, a clock parameter M from a reference value received in a packet. For example, when the area is "0," the value obtained by increasing the clock parameter M by four is transmitted to the clock generator 14, and the read clock speeds up. When the area is "5," the value obtained by decreasing the clock parameter M by one is transmitted to the clock generator 14, and the read clock slightly slows down. As just described, the frequency of the read clock is adjusted depending on areas.

Figure 5:
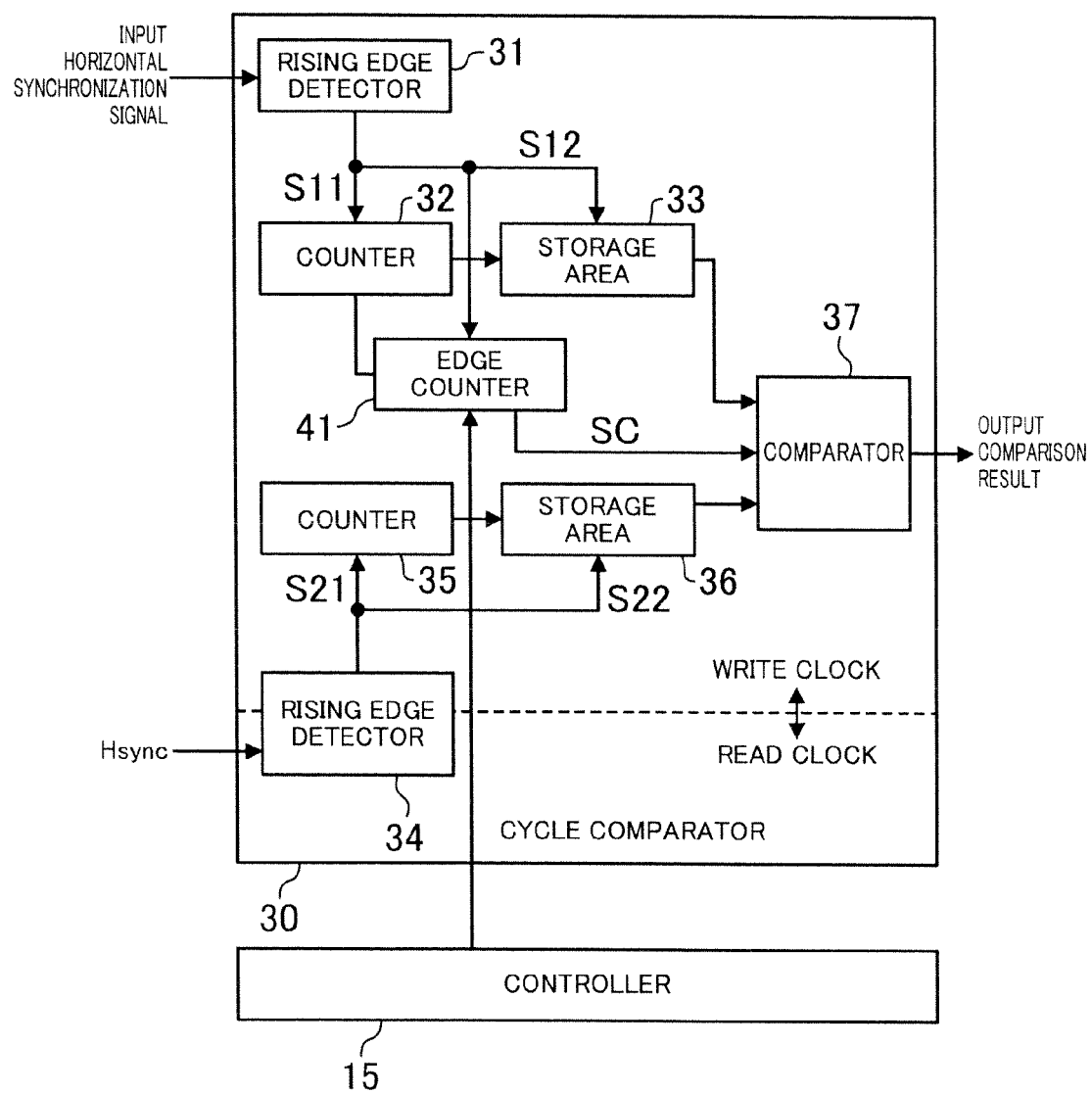
FIG. 5 is a diagram illustrating another example of the configuration of the cycle comparator of the first embodiment.

FIG. 5 illustrates another example of the configuration of the cycle comparator in the present embodiment. Referring to FIG. 5, an edge counter 41 is added to the configuration of FIG. 2, and the cycle comparator 30 is configured such that the comparative result obtained by the comparator 37 is output every n horizontal cycles ("n" is an integer of equal to or greater than two). That is, the edge counter 41 counts the rising edges of the input horizontal synchronization signal, and outputs the comparison timing signal SC, which is output from the counter 32, to the comparator 37 every n counts. The value for n can be set from, e.g., the host CPU 2 via the controller 15. According to such a configuration, the timing of comparing the cycles can be freely set.

FIGS. 6(A), 6(B) and 6(C) illustrate examples of comparison performed by the circuit of FIG. 5. Referring to FIG. 6(A), when n=1, comparison is performed every line. Referring to FIG. 6(B), when n=2, comparison is performed every two lines. That is, referring to FIG. 6(C), comparison is performed every n lines. Since the cycle of performing clock adjustment can be freely set, optimal comparison timing can be freely set according to the characteristics on the transmission side. In this case, the frequency of the read clock is adjusted so as to increase, decrease, or be unchanged with the period corresponding to n times the horizontal cycle of the output data as a unit.

In the foregoing configuration, the cycle of the horizontal synchronization timing is compared between the write data and the read data, and the input horizontal synchronization signal and the horizontal synchronization signal Hsync are input to the cycle comparator 30. Instead, the cycle of vertical synchronization timing may be compared between the write data and the read data, and an input vertical synchronization signal and a vertical synchronization signal Vsync may be input to the cycle comparator 30. In this case, the configuration of the cycle comparator 30 may be similar to those of FIGS. 2 and 5.

FIGS. 7(A), 7(B) and 7(C) illustrate examples of comparison in the case where the vertical synchronization cycle is compared in the circuit similar to that of FIG. 5. Referring to FIG. 7(A), when n=1, comparison is performed every field. Referring to FIG. 7(B), when n=2, comparison is performed every two fields. That is, referring to FIG. 7(C), comparison is performed every n fields. Since the cycle of performing clock adjustment can be freely set, optimal comparison timing can be freely set according to the characteristics on the transmission side. In this case, the frequency of the read clock is adjusted so as to increase, decrease, or be unchanged with the period corresponding to n times the vertical cycle of the output data as a unit.

Figure 8:
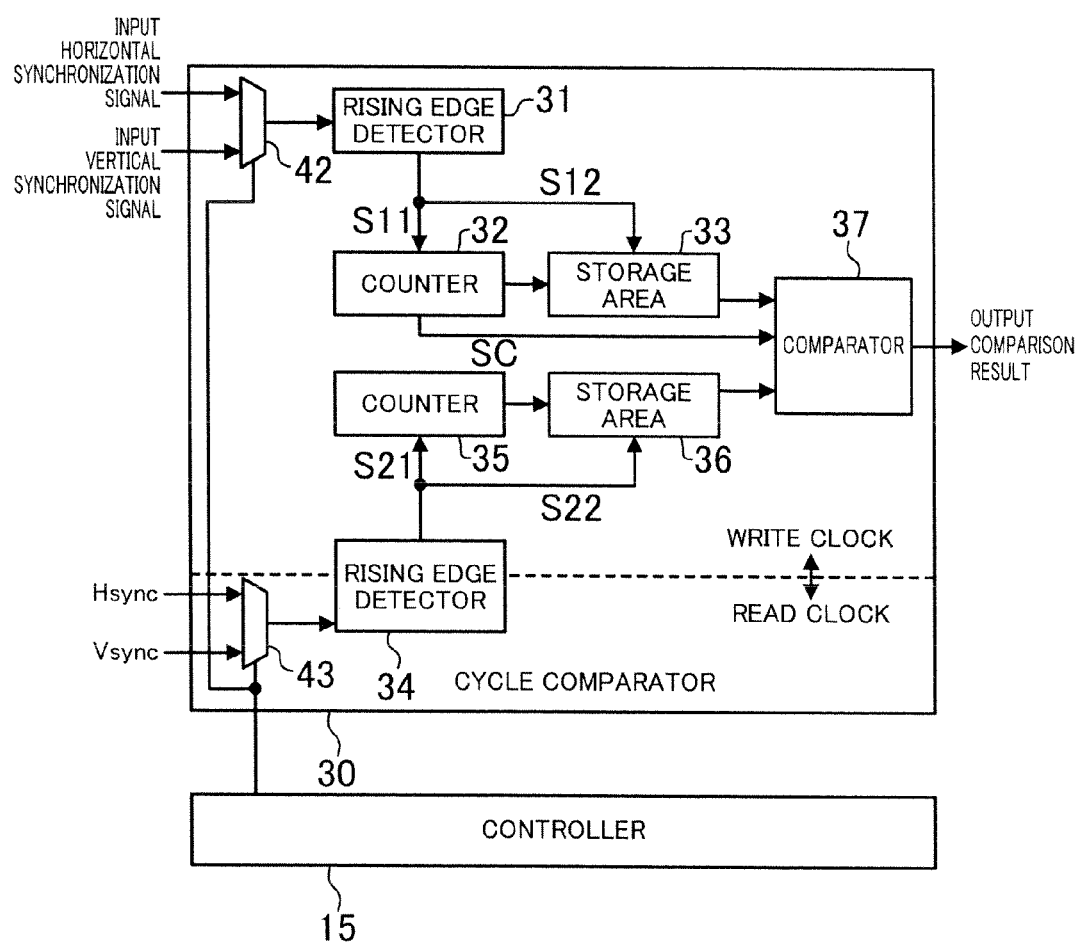
FIG. 8 is a diagram illustrating still another example of the cycle comparator of the first embodiment.

FIG. 8 is still another example of the cycle comparator in the present embodiment. In the configuration of FIG. 8, either of the horizontal synchronization cycle or the vertical synchronization cycle can be selected and compared. That is, a first selector 42 is configured to select and output either of the input horizontal synchronization signal or the input vertical synchronization signal and to supply the output signal to the rising edge detector 31. A second selector 43 is configured to select and output either of the horizontal synchronization signal Hsync or the vertical synchronization signal Vsync and to supply the output signal to the rising edge detector 34. Selection performed by the selectors 42, 43 can be controlled from, e.g., the host CPU 2 via the controller 15. Operation of other components are similar to that of the configuration of FIG. 2.

According to the foregoing configuration, since it can be freely set whether the horizontal synchronization signal or the vertical synchronization signal is used for adjustment, optimal comparison timing can be freely set according to the characteristics on the transmission side. Note that the edge counter 41 illustrated in FIG. 5 may be added to the configuration of FIG. 8, and the cycle comparator 30 may be configured such that comparison can be performed every n lines or every n fields.

Second Embodiment

The configuration and operation of a video processing system of a second embodiment is similar to those of the first embodiment. However, the second embodiment is different from the first embodiment in the configuration and operation of a cycle comparator 30.

Figure 9:
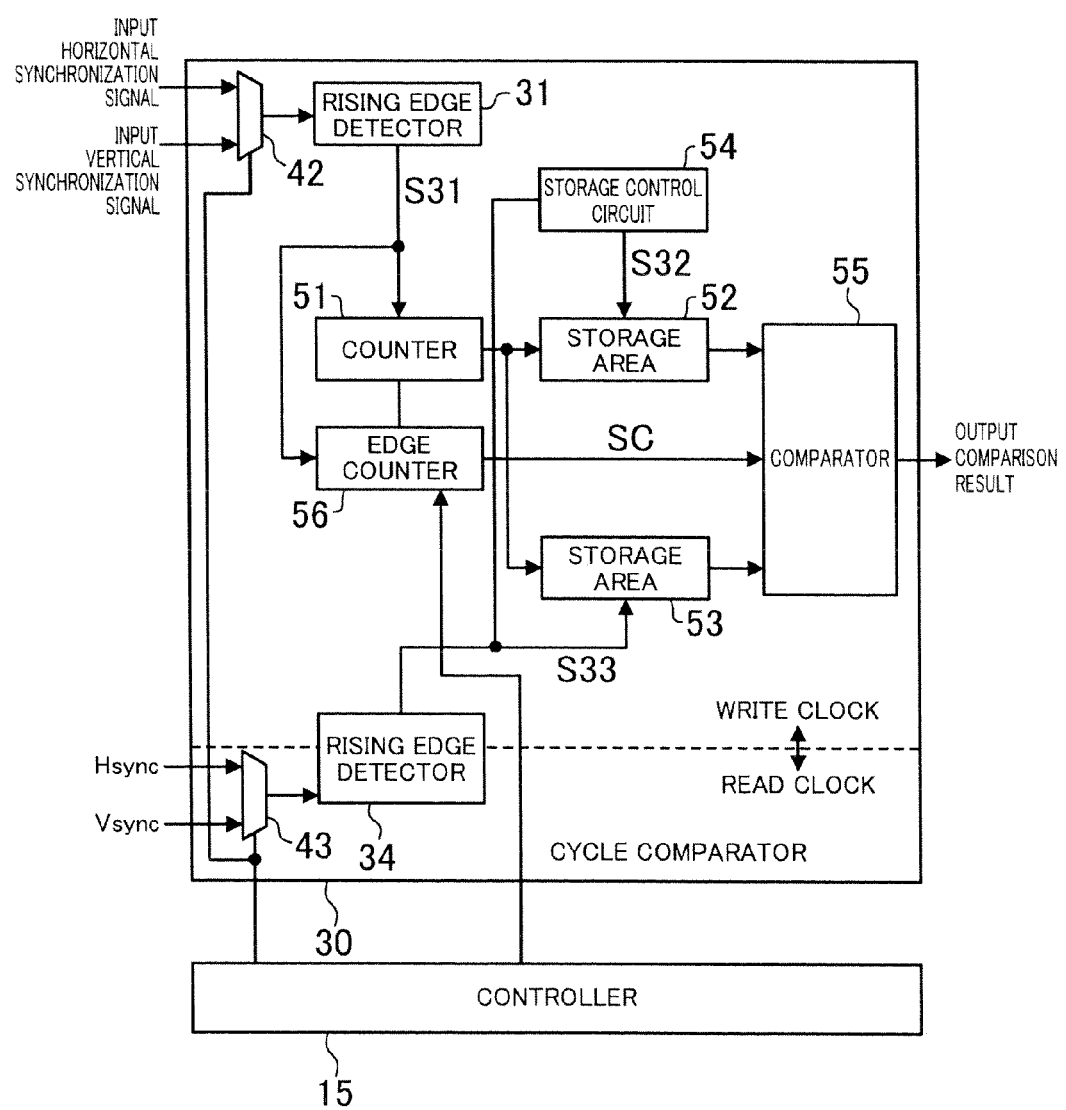
FIG. 9 is a diagram illustrating an example of the configuration of a cycle comparator of a second embodiment.

FIG. 9 illustrates an example of the configuration of the cycle comparator in the second embodiment. The cycle comparator 30 illustrated in FIG. 9 is configured to receive an input horizontal synchronization signal and an input vertical synchronization signal from a write data processor 20 and to receive a horizontal synchronization signal Hsync, i.e., an output horizontal synchronization signal, and a vertical synchronization signal Vsync, i.e., an output vertical synchronization signal, from a Sync generator 25. A selector 42 serving as a first selector is configured to select and output either of the input horizontal synchronization signal or the input vertical synchronization signal and to supply the output signal to a rising edge detector 31. A selector 43 serving as a second selector is configured to select and output either of the horizontal synchronization signal Hsync or the vertical synchronization signal Vsync and to supply the output signal to a rising edge detector 34. Selection performed by the selectors 42, 43 can be controlled from, e.g., a host CPU 2 via a controller 15.

Note that the cycle comparator of the present embodiment may be configured such that the input horizontal synchronization signal and the horizontal synchronization signal Hsync are input to the cycle comparator, or that the input vertical synchronization signal and the vertical synchronization signal Vsync are input to the cycle comparator. In these cases, the selectors 42, 43 are not necessary.

The rising edge detectors 31, 34, a counter 51, a storage area 52 serving as a first storage area, and a storage area 53 serving as a second storage area form a counter.

The rising edge detector 31 is configured to detect a rising edge of the input horizontal synchronization signal or the input vertical synchronization signal selected and output by the selector 42 and to transmit the detected edge signal to the counter 51 as a counter start signal S31. The counter 51 counts up in synchronization with a write clock, and is cleared by the counter start signal S31.

On the other hand, the rising edge detector 34 is configured to detect a rising edge of the horizontal synchronization signal Hsync or the vertical synchronization signal Vsync selected and output by the selector 43. Then, the rising edge detector 34 shifts the rising edges so that sampling can be performed using the write clock, and causes the horizontal synchronization signal Hsync or the vertical synchronization signal Vsync to be synchronized with the write clock. Subsequently, the rising edge detector 34 outputs a counter storage signal S33. Note that the signal transferring between two different clocks is only the horizontal synchronization signal Hsync or the vertical synchronization signal Vsync, and therefore this saves time and manpower in, e.g., clock transfer using Gray code.

The counter storage signal S33 is provided from the rising edge detector 34 to the storage area 53. Upon reception of the counter storage signal S33, the storage area 53 holds the count value obtained by the counter 51. The count value obtained, using the write clock, between the rising edge of the input horizontal synchronization signal and the rising edge of the horizontal synchronization signal Hsync is held by the storage area 53 every rising edge of the horizontal synchronization signal Hsync, or the count value obtained, using the write clock, between the rising edge of the input vertical synchronization signal and the rising edge of the vertical synchronization signal Vsync is held by the storage area 53 every rising edge of the vertical synchronization signal Vsync.

On the other hand, a storage control circuit 54 is configured to provide, upon reception of the counter storage signal S33 from the rising edge detector 34, a counter storage signal S32 to the storage area 52. The storage control circuit 54 outputs the counter storage signal S32 only once, e.g., after start-up. Upon reception of the counter storage signal S32, the storage area 52 holds the count value obtained by the counter 51. Thus, the count value obtained, using the write clock, between the rising edge of the input horizontal synchronization signal and the rising edge of the horizontal synchronization signal Hsync or the count value obtained, using the write clock, between the rising edge of the input vertical synchronization signal and the rising edge of the vertical synchronization signal Vsync is held by the storage area 52 at the first rising edge of the horizontal synchronization signal Hsync or the vertical synchronization signal Vsync after start-up.

That is, in the configuration of FIG. 9, e.g., the post-start-up value for time difference in horizontal synchronization timing or vertical synchronization timing between a write side and a read side is held by the storage area 52, and the subsequently-obtained values are sequentially held by the storage area 53. Counting by the counter may be performed using a predetermined clock other than the write clock.

A comparator 55 is configured to compare, according to a comparison timing signal SC, between the count value stored in the storage area 52 and the count value stored in the storage area 53 and to output a comparison result. For example, the difference between two count values is output as the comparison result. In this case, the comparison timing signal SC is output from the counter 51. The counter 51 outputs the comparison timing signal SC, e.g., when the value reaches the half of the count value stored in the storage area 52 during counting. An edge counter 56 counts the rising edges of the input horizontal synchronization signal or the input vertical synchronization signal, and outputs the comparison timing signal SC, which is output from the counter 51, to the comparator 55 every n counts. The value for n can be set from, e.g., the host CPU 2 via the controller 15. According to such a configuration, the timing of comparing the time differences can be freely set. Note that the unit and method for generating the comparison timing signal SC is not limited to the foregoing as long as comparison is performed off the timing at which the counter values are written in the storage areas 52, 53. Alternatively, the comparison timing signal SC may be directly provided from, e.g., the counter 51 to the comparator 55 without the storage area 52 being provided.

A clock parameter may be adjusted as in the first embodiment.

Upon start-up, it is ensured that the difference between a write address and a read address in a RAM 21 is maintained in a desired relationship such as the relationship in which the difference between the write address and the read address corresponds to about the half of the depth of the RAM 21. However, as the operation proceeds after start-up, errors in a read clock may be accumulated due to, e.g., the delay in reception of a clock generation parameter, resulting in breakdown in relationship between the write address and the read address. For such a reason, in the present embodiment, the value, which is first obtained after start-up, for time difference in horizontal synchronization timing or vertical synchronization timing between the write side and the read side is held, and the held first value is compared with each of the subsequently-obtained values. Based on the comparison results, the frequency of the read clock is adjusted. Thus, it is ensured that failure in RAM address control is reduced or prevented.

Figure 10:
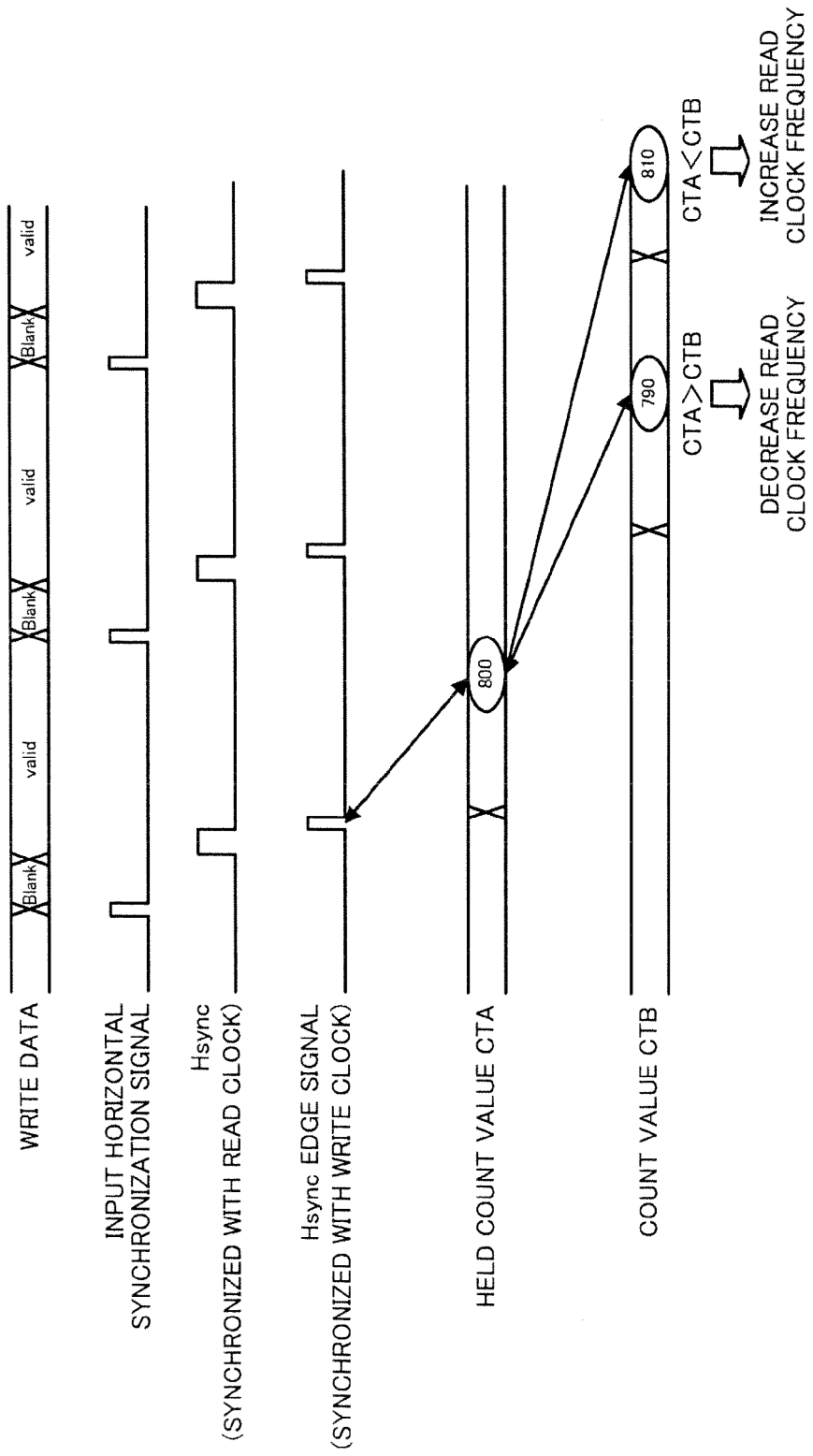
FIG. 10 is a diagram illustrating adjustment performed in the second embodiment.

FIG. 10 illustrates an example of adjustment performed in the present embodiment. Note that, in FIG. 10, the selectors 42, 43 select and output the input horizontal synchronization signal and the horizontal synchronization signal Hsync, respectively. Moreover, adjustment is performed every line.

The cycle comparator 30 generates an Hsync edge signal synchronized with the write clock from the horizontal synchronization signal Hsync synchronized with the read clock. The time difference between an edge of the input horizontal synchronization signal and an edge of the Hsync edge signal is counted using the write clock. A count value CTA upon start-up is held, and the held count value CTA is compared with each of subsequently-obtained count values CTB.

When the count value CTA is "800," and the count value CTB is "790," CTA>CTB. Thus, the time difference between the edges becomes shorter than that upon start-up. This assumes that the read clock is faster (has a higher frequency), and therefore a clock generator 14 is adjusted such that the frequency of the read clock is decreased. Accordingly, transition of the read address slows down.

On the other hand, when the count value CTA is "800," and the count value CTB is "810," CTA<CTB. Thus, the time difference between the edges becomes longer than that upon start-up. This assumes that the read clock is slower (has a lower frequency), and therefore the clock generator 14 is adjusted such that the frequency of the read clock is increased. Accordingly, transition of the read address speeds up.

As just described, the frequency of the read clock is adjusted such that the time difference in synchronization timing between the write side and the read side is maintained constant. That is, in the present embodiment, the frequency of the read clock is also adjusted so as to increase, decrease, or be unchanged with the period corresponding to the horizontal cycle of output data, the vertical cycle of the output data, n times the horizontal cycle of the output data, or n times the vertical cycle of the output data as a unit. Thus, it can be ensured that the relationship between the write address and the read address in the RAM 21 is maintained. As a result, failure in RAM address control can be reduced or prevented in advance.

OTHER EMBODIMENTS

The first and second embodiments may be implemented in combination with each other.

Figure 11:
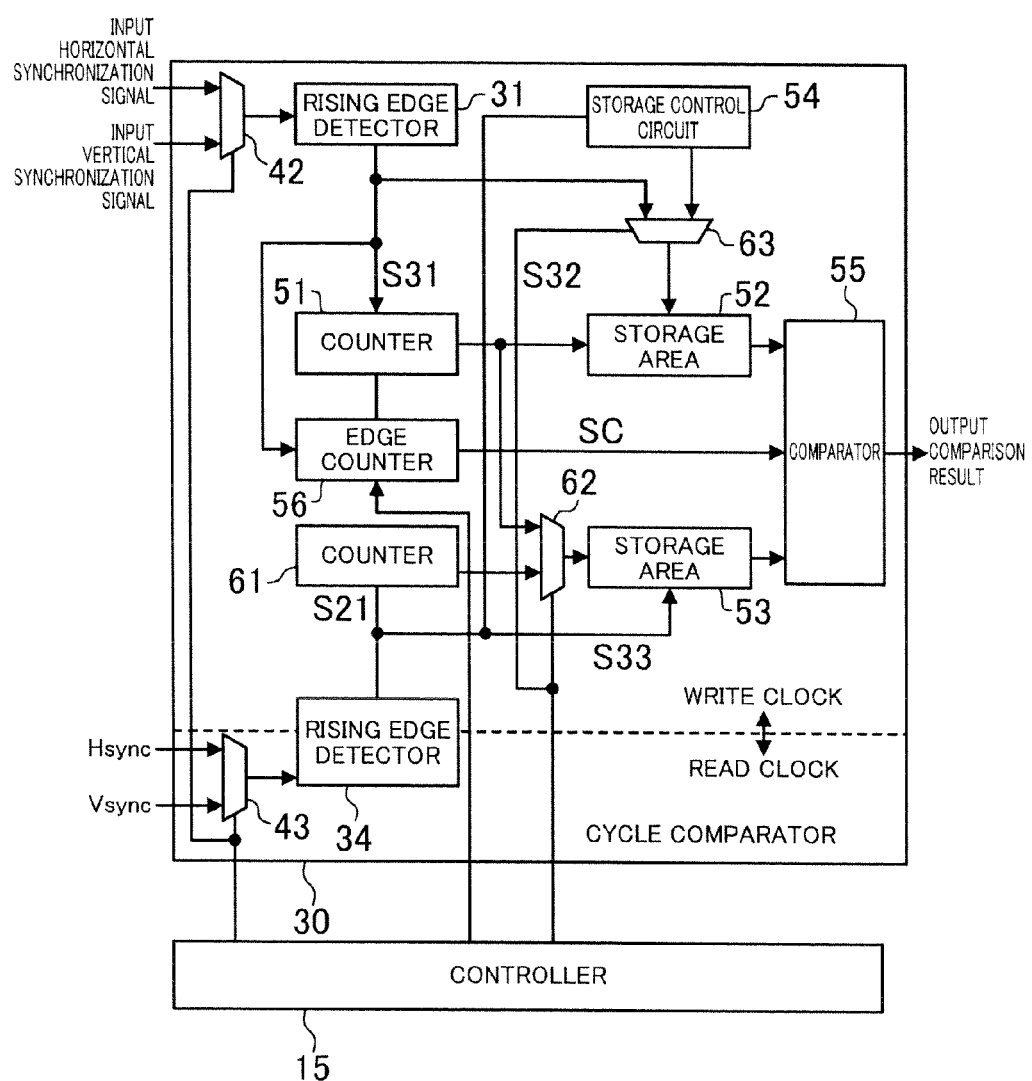
FIG. 11 is a diagram illustrating an example of the configuration of a cycle comparator configured by combining the first and second embodiments.

FIG. 11 illustrates an example of the configuration of a cycle comparator of another embodiment, and the operation of the first embodiment and the operation of the second embodiment can be selectively performed. In comparison with the configuration of FIG. 9, a counter 61 and selectors 62, 63 are added. The counter 61 is operated as in the counter 35 of the configuration of FIG. 2. Selection performed by the selectors 62, 63 can be controlled from, e.g., the host CPU 2 via the controller 15.

In the case of performing the operation of the first embodiment, the selector 62 selects and outputs a signal output from the counter 61, and the selector 63 selects and outputs a signal output from the rising edge detector 31. On the other hand, in the case of performing the operation of the second embodiment, the selector 62 selects and outputs a signal output from the counter 51, and the selector 63 selects and outputs a signal output from the storage control circuit 54. According to the configuration of FIG. 11, the storage areas 52, 53 can be shared between the operations of the first and second embodiments, and a single counter 61 and two selectors 62, 63 are merely added to the configuration of FIG. 9. Thus, a circuit size can be reduced.

Figure 12:
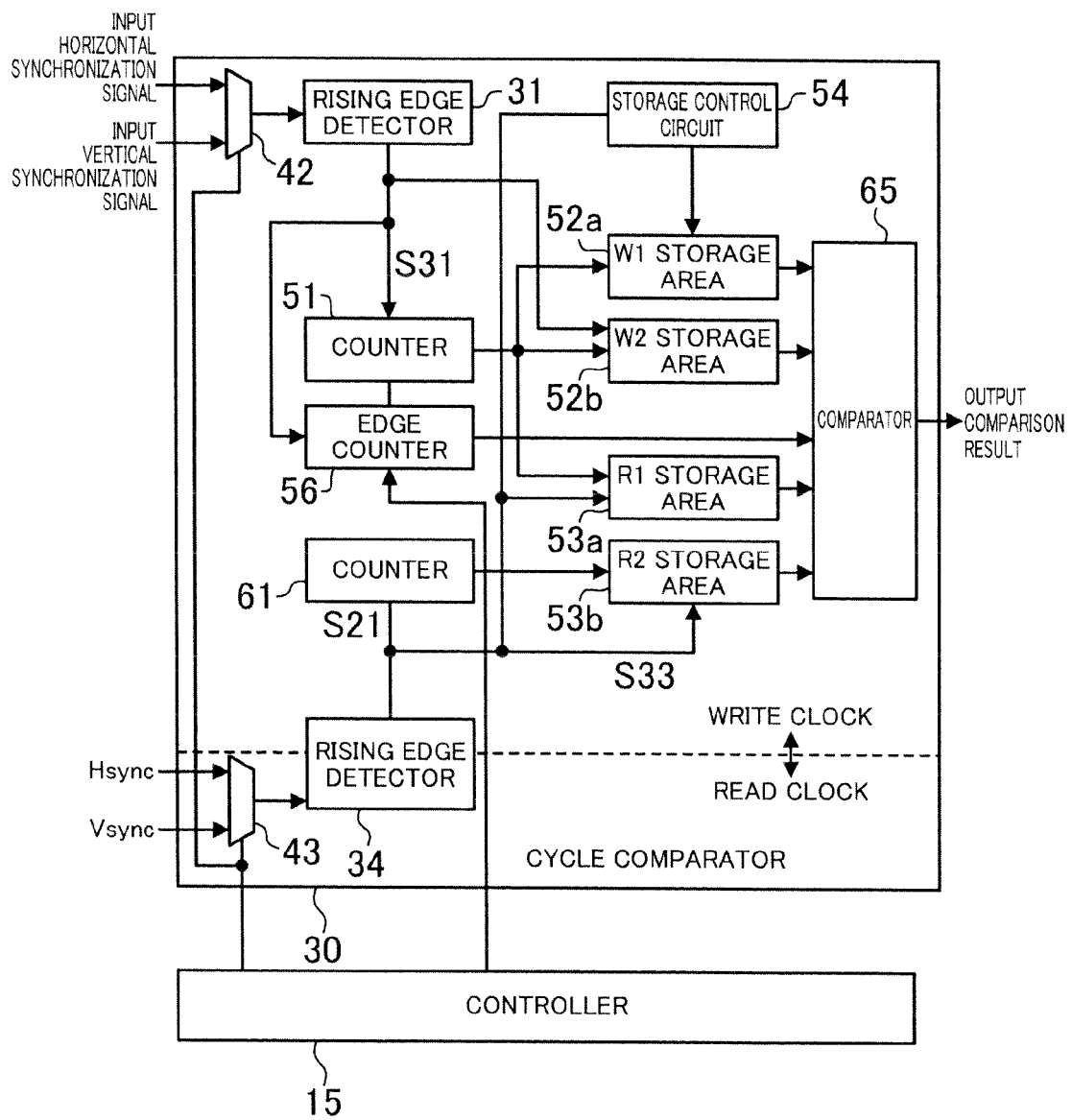
FIG. 12 is a diagram illustrating another example of the configuration of the cycle comparator configured by combining the first and second embodiments.

FIG. 12 illustrates an example of the configuration of a cycle comparator of still another embodiment, and the operation of the first embodiment and the operation of the second embodiment can be selectively performed. In comparison with the configuration of FIG. 9, a counter 61 is added, two storage areas 52a, 52b are provided instead of the storage area 52, and two storage areas 53a, 53b are provided instead of the storage area 53. A comparator 65 is configured to receive signals output from the storage areas 52a, 52b, 53a, 53b.

Comparison targets for operation of the first embodiment are stored in the storage areas 52b, 53b, and comparison targets for operation of the second embodiment are stored in the storage areas 52a, 53a. The comparator 65 calculates the difference between the output of the storage area 52b and the output of the storage area 53b, and calculates the difference between the output of the storage area 53a and the output of the storage area 53b. Then, the comparator 65 outputs, e.g., a larger one of the differences as a comparison result. According to such a configuration, a clock frequency can be adjusted by two types of methods, and therefore it can be further ensured that failure in RAM address control is reduced or prevented.

Needless to say, the edge counter 56 may be omitted from the configuration of FIG. 11 or 12. The selectors 42, 43 may be omitted such that an input horizontal synchronization signal and a horizontal synchronization signal Hsync are input to the cycle comparator 30 or that an input vertical synchronization signal and a vertical synchronization signal Vsync are input to the cycle comparator 30.

Figure 13:
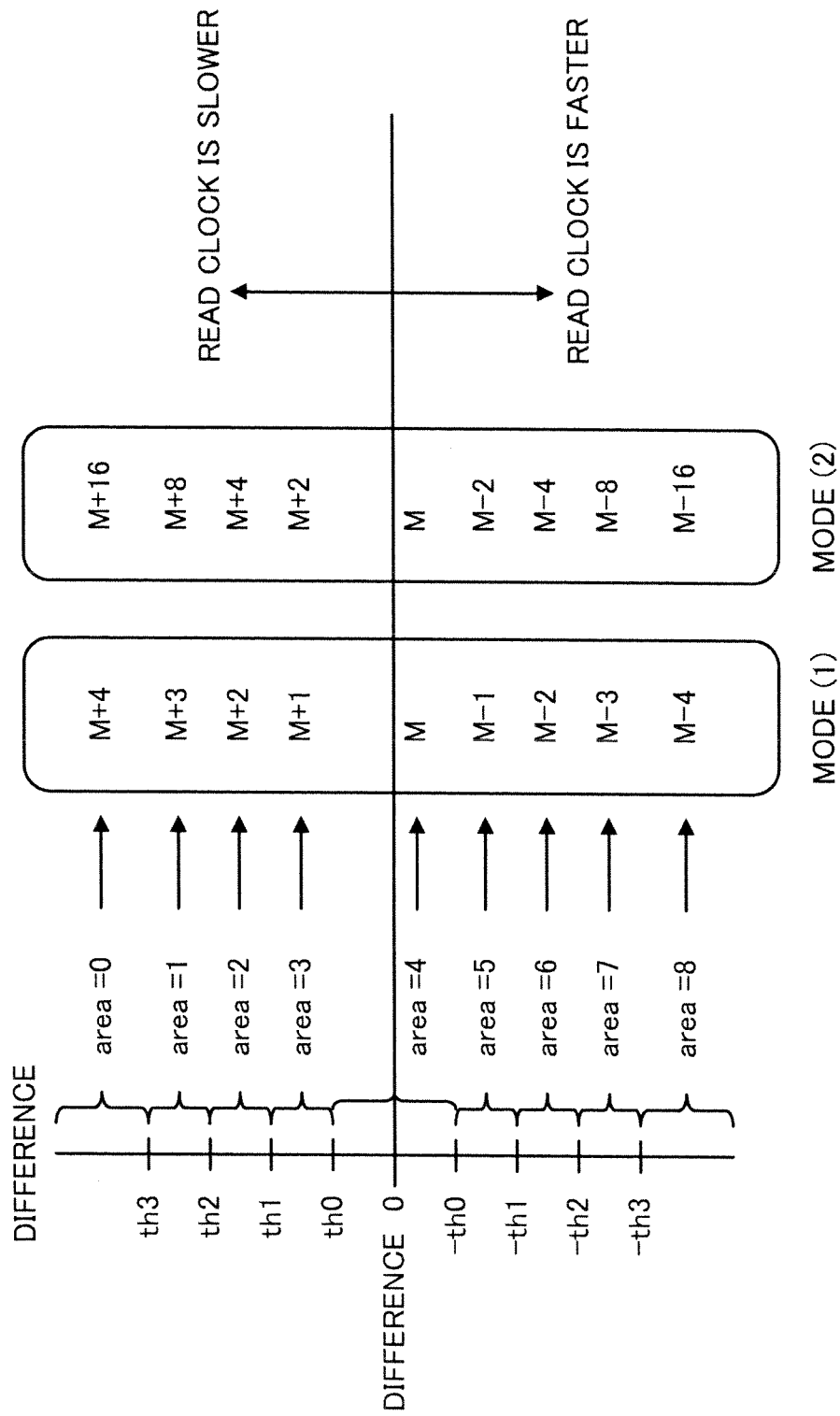
FIG. 13 is a diagram illustrating another example of the method for adjusting the clock parameter.

FIG. 13 illustrates another example of clock parameter adjustment. In the example of FIG. 13, the clock parameter adjuster 28 has a plurality of modes for parameter adjustment. Such modes can be switched from, e.g., the host CPU 2 via the controller 15. For example, when the area is "0," if the mode is "(1)," the clock parameter M is increased by four. On the other hand, if the mode is "(2)," the clock parameter M is increased by 16. That is, the plurality of modes allow a change in clock adjustment range, and therefore an optimal clock adjustment range can be set according to the characteristics on the transmission side. Note that the number of modes and the adjustment range in each mode are not limited to the foregoing.

Figure 14:
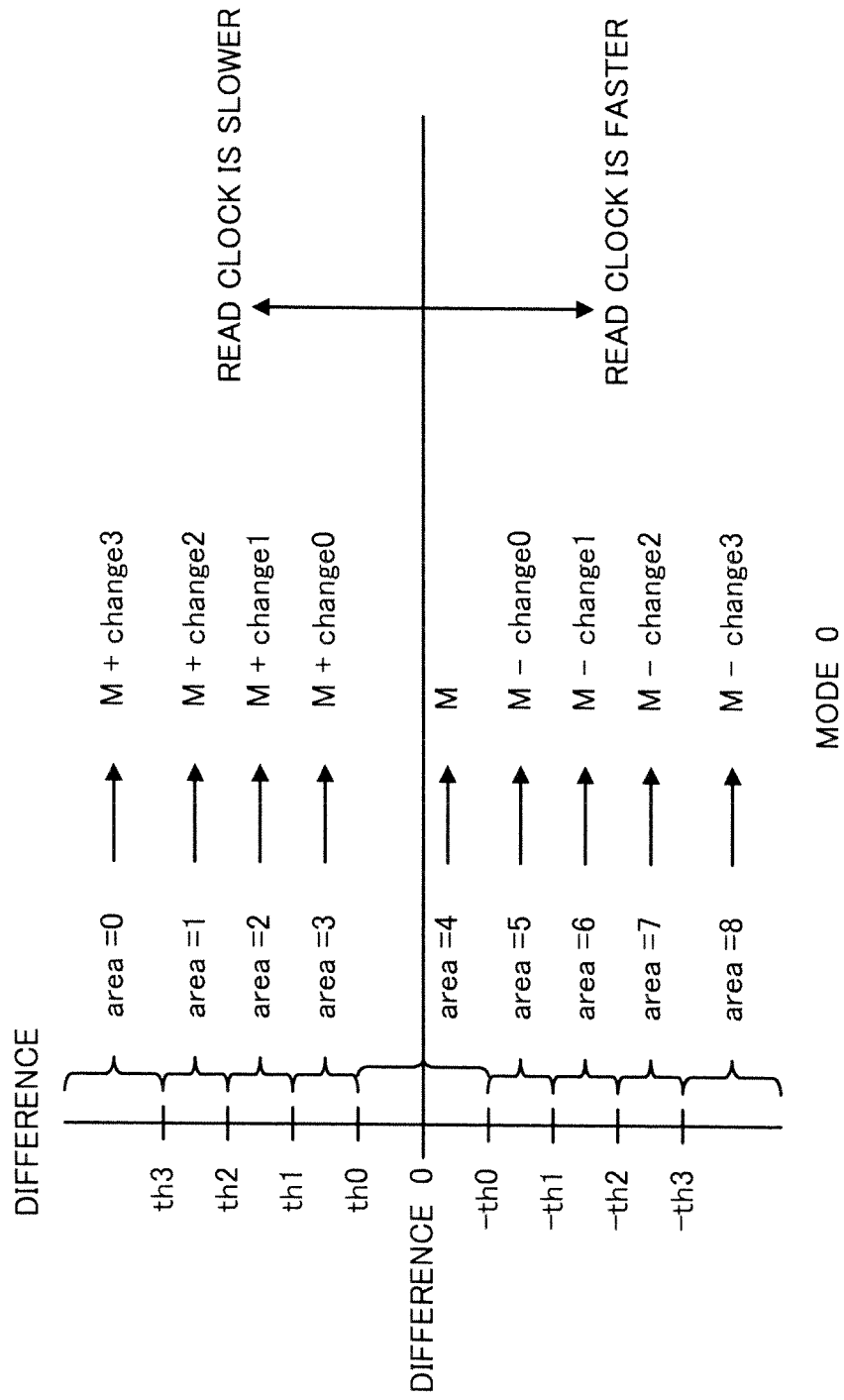
FIG. 14 is a diagram illustrating still another example of the method for adjusting the clock parameter.

FIG. 14 illustrates still another example of clock parameter adjustment. In the example of FIG. 14, the clock parameter adjuster 28 is configured such that the adjustment degrees −change3 to +change3 of the clock parameter M are adjustable from an external unit. Such adjustment degrees −change3 to +change3 can be freely set from, e.g., the host CPU 2 via the controller 15. As just described, since the clock adjustment range can be freely changed, an optimal clock adjustment range can be set according to the characteristics on the transmission side. Note that, in FIG. 14, the same adjustment degrees change0 to change3 are set between the positive side and the negative side, but different adjustment degrees may be, needless to say, set between the positive side and the negative side.

In the foregoing embodiments, the clock parameter M is adjusted. However, the present disclosure is not limited to such a configuration. For example, a clock parameter N may be adjusted, or both of the clock parameters M, N may be adjusted.

In the foregoing embodiments, the clock parameter is adjusted after area determination. However, the present disclosure is not limited to such a configuration. For example, the clock parameter may be, without area determination, adjusted directly based on the comparative result of the cycle comparator 30.

In the foregoing embodiments, the clock parameter is adjusted by the method by which the read clock is generated from the write clock by the clock generation parameter transmitted from the transmission side. However, the present disclosure is not limited to such a configuration. For example, in the case of the transmission method by which a read clock is extracted from received data, a read clock frequency itself may be adjusted depending on a comparison result of the cycle comparator 30.

In the foregoing description, the input data and the output data are video data. In the first embodiment, the horizontal synchronization timing or the vertical synchronization timing is compared between the input data and the output data. In the second embodiment, the time difference in horizontal synchronization timing or vertical synchronization timing is sequentially compared between the input data and the output data. Note that the present disclosure is not limited to the foregoing. The input data and the output data may be data other than video data. Moreover, a predetermined event other than the horizontal synchronization timing and the vertical synchronization timing may be targeted for comparison in cycles or comparison in time differences.

According to the present disclosure, memory address conflict in the clock transfer circuit can be reduced or prevented in advance, resulting in quality improvement. In addition, since a memory size can be reduced, a circuit size and power consumption can be reduced in video transmission or sound transmission requiring clock transfer.

What is claimed is:
1. A clock transfer circuit which receives input data synchronized with a first clock and outputs, as output data, data synchronized with a second clock having a frequency different from that of the first clock, comprising:
   a memory;
   a write address controller that generates a write address of the memory in which the input data is written, the write address controller operating according to the first clock;
   a read address controller that generates, in order of writing the input data, a read address of the memory from which the output data is read, the read address controller operating according to the second clock;
   a cycle comparator that compares a held first value and a second value obtained after the first value is held, the first and second values each indicating a time difference of a predetermined event between the input data and the output data; and a clock adjuster that adjust, based on a comparison result obtained by the cycle comparator, the frequency of the second clock such that the time difference is maintained constant.

2. The clock transfer circuit of claim 1, wherein:
the cycle comparator receives, as input, horizontal synchronization signals of the input and output data or vertical synchronization signals of the input and output data, and
the cycle comparator includes
   a counter that counts a time difference between the horizontal synchronization signal or the vertical synchronization signal of the input data and the horizontal synchronization signal or the vertical synchronization signal of the output data, the counter including a first storage area where a time difference counted after start-up is held as the first value and a second storage area where the second value obtained after the first value is held is temporarily stored, and
   a comparator that compares the first value held in the first storage area and the second value temporarily stored in the second storage area to output a comparison result.

3. The clock transfer circuit of claim 2, wherein
the cycle comparator outputs the comparison result obtained by the comparator every n times of horizontal synchronization or vertical synchronization, where n is an integer of equal to or greater than two.

4. The clock transfer circuit of claim 2, wherein
the cycle comparator further includes
   a first selector that selects one of the horizontal synchronization signal or the vertical synchronization signal of the input data to output the selected signal to the counter, and
   a second selector that selects one of the horizontal synchronization signal or the vertical synchronization signal of the output data to output the selected signal to the counter.

5. The clock transfer circuit of claim 1, wherein:
the input data and the output data are video data, and
the predetermined event is horizontal synchronization timing or vertical synchronization timing.

6. The clock transfer circuit of claim 1, wherein
the clock adjuster includes
   an area determinator that determines within which one of a plurality of areas, which are separated according to thresholds, the comparison result of the cycle comparator falls, and
   a clock parameter adjuster that adjusts, depending on the area determined by the area determinator, a parameter for generating the second clock.

7. The clock transfer circuit of claim 6, wherein
the area determinator determines such that the thresholds are adjustable from an external unit.

8. The clock transfer circuit of claim 6, wherein:
the clock parameter adjuster has a plurality modes for parameter adjustment, and
the clock parameter adjuster adjusts such that one of the modes is selectable from an external unit.

9. The clock transfer circuit of claim 6, wherein
the clock parameter adjuster adjusts such that a degree of parameter adjustment is adjustable from an external unit.

10. A video processing system comprising:
the clock transfer circuit of claim 1.

11. A semiconductor integrated circuit comprising:
the clock transfer circuit of claim 1.

12. A clock transfer circuit which receives input data synchronized with a first clock and outputs, as output data, data synchronized with a second clock having a frequency different from that of the first clock, comprising:
a memory;
a write address controller that operates according to the first clock and generates a write address of the memory in which the input data is written;
a read address controller that operates according to the second clock and generates, in order of writing the input data, a read address of the memory from which the output data is read;
a cycle comparator that compares a held first value and a second value obtained after the first value is held, the first and second values being a time difference in a predetermined event between the input data and the output data; and
a clock adjuster that adjusts, based on a comparison result obtained by the cycle comparator, the frequency of the second clock such that the time difference is maintained constant, wherein:
the input data and the output data are video data, and
the predetermined event is horizontal synchronization timing or vertical synchronization timing.

13. A clock transfer circuit which receives input data synchronized with a first clock and outputs, as output data, data synchronized with a second clock having a frequency different from that of the first clock, comprising:
a memory;
a write address controller that operates according to the first clock and generates a write address of the memory in which the input data is written;
a read address controller that operates according to the second clock and generates, in order of writing the input data, a read address of the memory from which the output data is read;
a cycle comparator that compares a held first value and a second value obtained after the first value is held, the first and second values being a time difference in a predetermined event between the input data and the output data; and
a clock adjuster that adjusts, based on a comparison result obtained by the cycle comparator, the frequency of the second clock such that the time difference is maintained constant, wherein:
the clock adjuster includes
   an area determinator that determines within which one of a plurality of areas, which are separated according to thresholds, the comparison result of the cycle comparator falls, and
   a clock parameter adjuster that adjusts, depending on the area determined by the area determinator, a parameter for generating the second clock.

14. The clock transfer circuit of claim 13, wherein
the area determinator determines such that the thresholds are adjustable from an external unit.

15. The clock transfer circuit of claim 13, wherein:
the clock parameter adjuster has a plurality modes for parameter adjustment, and
the clock parameter adjuster adjusts such that one of the modes is selectable from an external unit.

16. The clock transfer circuit of claim 13, wherein
the clock parameter adjuster adjusts such that a degree of parameter adjustment is adjustable from an external unit.

* * * * *